United States Patent [19]

Petitcollin et al.

[11] Patent Number: 4,778,508
[45] Date of Patent: Oct. 18, 1988

[54] TRANSFER OF GLASS PANES FOR BENDING THEM

[75] Inventors: Jean-Marc Petitcollin; Pierre Marchal; Bernard Letemps; Daniel Philibert, all of Thourotte, France

[73] Assignee: Saint-Gobain Vitrage, Courbevoie, France

[21] Appl. No.: 42,294

[22] Filed: Apr. 24, 1987

[30] Foreign Application Priority Data

Apr. 29, 1986 [FR] France ................. 86 06172

[51] Int. Cl.⁴ .................................... C03B 23/035
[52] U.S. Cl. ........................... 65/107; 65/104; 65/273; 65/289
[58] Field of Search .......... 65/104, 107, 273, 285, 65/289, 106

[56] References Cited

U.S. PATENT DOCUMENTS

| | | | |
|---|---|---|---|
| 4,028,086 | 6/1977 | Rahrig et al. | 65/285 X |
| 4,497,645 | 2/1985 | Peltonen | 65/107 |
| 4,609,391 | 9/1986 | McMaster | 65/107 X |
| 4,682,997 | 7/1987 | Halberschmidt et al. | 65/104 X |

Primary Examiner—Arthur Kellogg
Attorney, Agent, or Firm—Oblon, Fisher, Spivak, McClelland & Maier

[57] ABSTRACT

A device and process for transferring glass panes for bending comprise the raising of glass panes with a gaseous flow until they meet with an upper conveyor, maintaining contact with that conveyor and simultaneously shifting them along that conveyor, then bringing them down anew on a bending form upon which they subside.

16 Claims, 3 Drawing Sheets

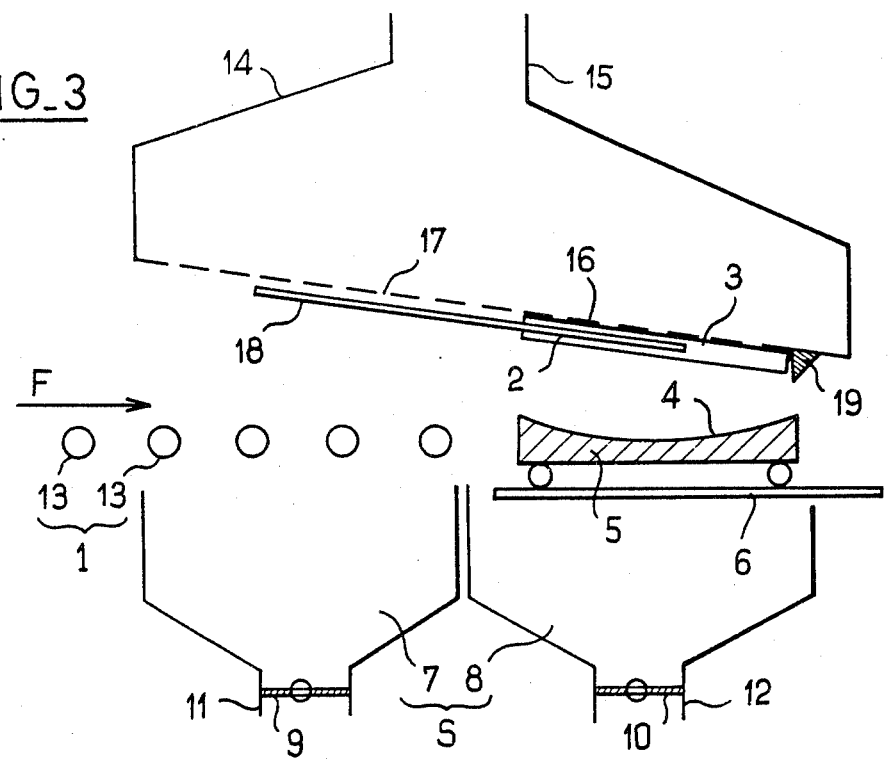
FIG_3
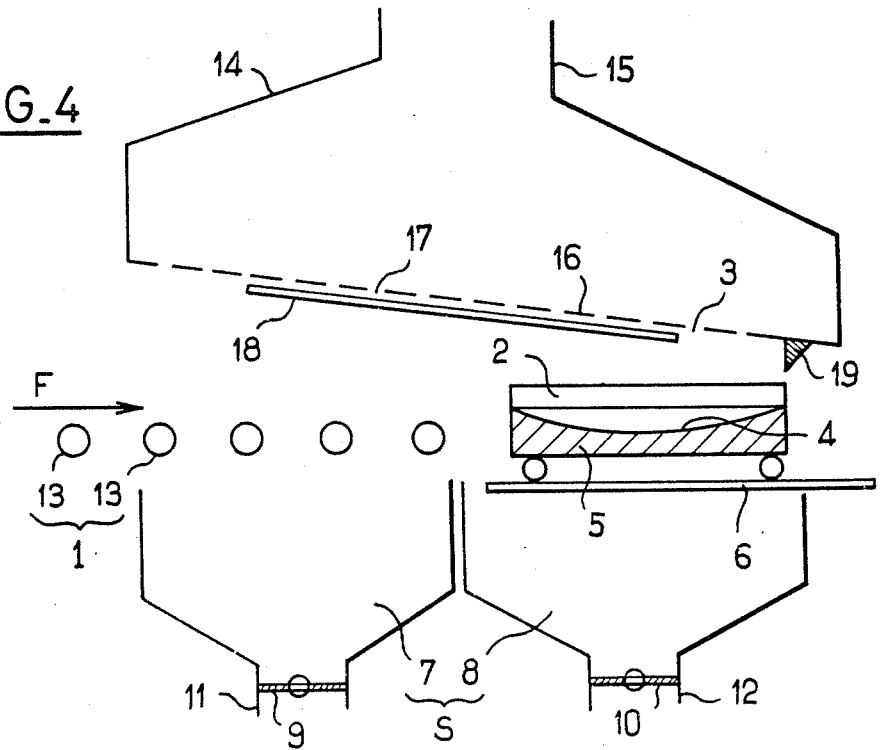
FIG_4

TRANSFER OF GLASS PANES FOR BENDING THEM

BACKGROUND OF THE INVENTION

1. Field of the Invention

This invention pertains to the transfer of pane objects like glass panes from one conveyor to another device, this transfer applying especially in the context of a glass pane bending facility.

2. Background of Prior Art

It is known that during glass pane bending operations, said panes are transferred, from a horizontal conveyor on which they arrive to a bending form, for instance comprised of a curved profile frame, open at its center, with a mechanical transfer device that seizes the panes, lifts them, then releases them and/or brings them down to lay them on the bending form which, in the meantime was set up beneath the transfer device.

Such devices are described for instance in patents EP No. 3 391 by MAC MASTER, FR No. 2 085 464 by SAINT-GOBAIN.

The gripping of the glass panes is done usually as a result of a suction exerted either through the gripping means of the transfer device (EP No. 3 391) or basically at the periphery of said means (FR No. 2 085 464).

In these prior techniques, the same transfer device is mobilized during the ascent of the glass panes as well as during their descent. Hence, the rates, which are already high, cannot be increased substantially.

Furthermore, the glass panes must be stopped with great accuracy beneath the transfer device, which also increases the relative slowness of the process and requires sophisticated and therefore costly equipment.

The mechanical transfer device is also costly in and of itself, since it must be made of special materials in order to resist heat and must be made so as to be disassembled in order to be changed for each window model, which differs from the previous model in shape and/or in size.

This transfer device requires also that it be enclosed inside a heated structure which must be of significant size, especially in terms of height, in order to allow vertical movements at each grip of a glass pane, which amounts to high energy costs.

SUMMARY OF THE INVENTION

This invention is designed to avoid the inconvenience of the prior techniques.

It comprises to that end a transfer technique for glass panes from an intake conveyor of said panes, or a support means of said panes, to a bending form, which allows quick motion, cognizant of the positioning inaccuracies of the glass panes on the intake conveyor or the support means, calling on simpler, less cumbersome means, not requiring a major structure and thus allowing energy savings.

Thus, the invention comprises a bending process for glass panes taken at a bending temperature in which said panes available in a flat position, more or less horizontally, are raised as a result of a gaseous flow until they meet an upper conveyor, they are kept in contact with this conveyor and they are simultaneously shifted according to its length, then they are brought down anew on a bending form.

Advantageously, the upper conveyor is oblique with respect to the lower and the glass panes are shifted along said conveyor from a specified level at the place where they first contact it, to a different level further on, where they descend to the bending form.

The invention also comprises a device to execute the process, which includes an upper conveyor, a lower and more or less horizontal device beneath the upstream end of the upper conveyor, a bending form placed under the other end of the upper conveyor, blowing means under the bottom of the support to transform the glass panes, and means to allow the glass panes to proceed along the upper conveyor.

BRIEF DESCRIPTION OF THE DRAWINGS

The invention will be described now in greater detail by referring to the enclosed figures which depict:

FIGS. 1, 2, 3, 4, 5: the various phases of the bending process of a glass pane inside a device according to a first variation, FIG. 1 is a diagram illustrating the arrival of a glass pane inside the device;

FIG. 2 is a diagram illustrating the sending off of said glass pane;

FIG. 3 is a diagram illustrating the advance of the glass sheet kept flat against the upper conveyor;

FIG. 4 is a diagram illustrating the renewed descent of the glass sheet on the bending form;

FIG. 5 is a diagram illustrating the evacuation of the glass sheet from the bending device.

DETAILED DESCRIPTION OF THE INVENTION

Figure 1:
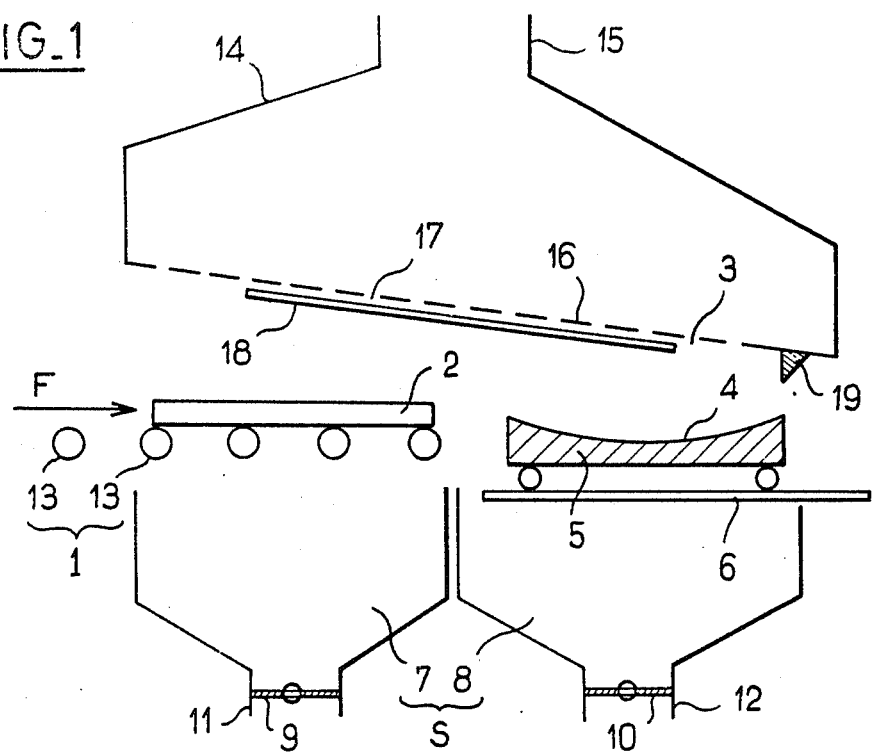
Figure 2:
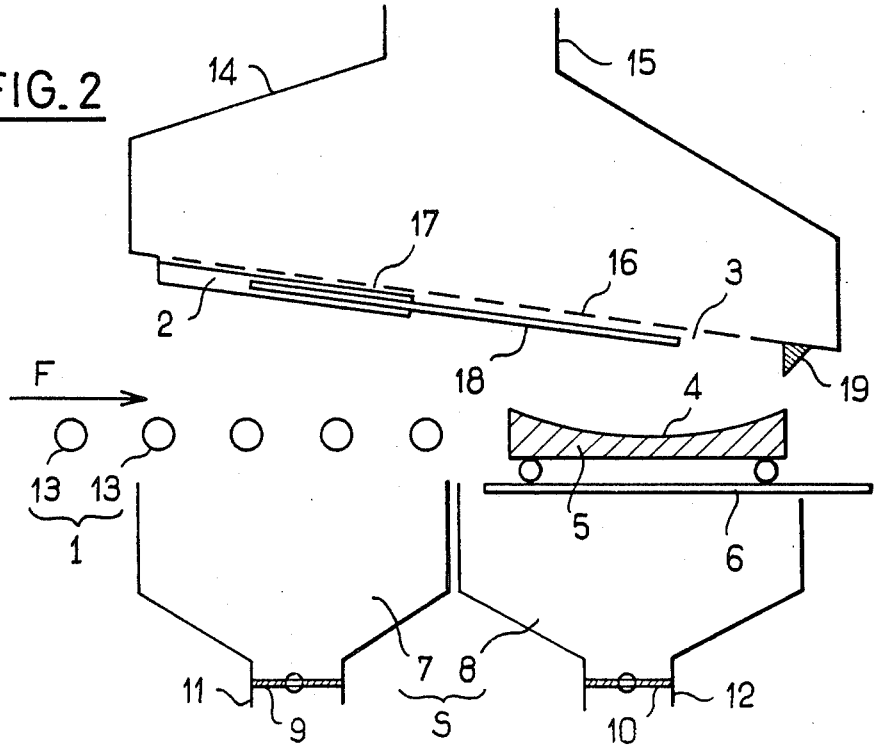
Figure 5:
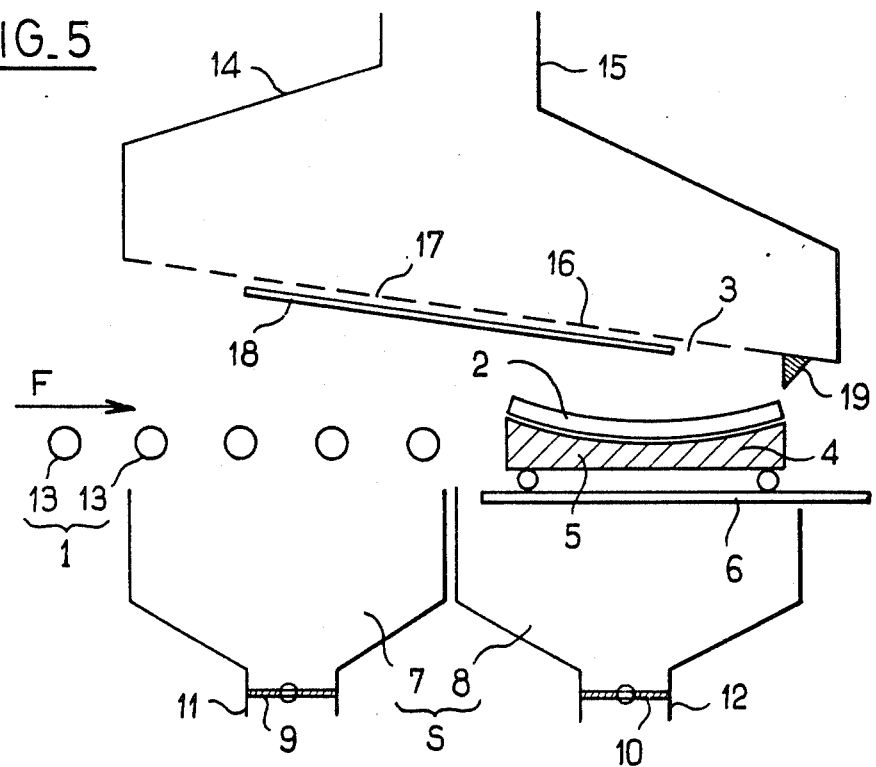

FIGS. 1, 2, 3, 4 and 5 depict a first variation of a bending device according to the invention. This bending device includes a first conveyor 1, horizontal or approximately so, which brings glass panes Z in the direction of arrow F inside the bending device, at a first, low level, a second conveyor 3 which crosses the entire bending device at a higher level and of which at least a portion is over the downstream portion of conveyor 1, a bending form 4 located in ready position inside the bending device beyond the conveyor 1 beneath the downstream end of the upper conveyor 3, gas blowing means S set up under the downstream end of the lower conveyor 1, beneath the bending form and along the entire length of the upper conveyor 3.

Advantageously, the bending form 4 is mobile, for instance mounted onto a trolley 5 with rollers, so as to be able to exit from the bending device by running on rails 6.

In preferred embodiments, the bending form is such that it allows the gasses from blowing means S to pass, and it is particularly a curved profile frame, open at its center, designed to support the glass panes 2 from their periphery.

Preferably, the blowing means S is comprised of at least two blowing caissons 7 and 8 independent of one another, caisson 7 being placed beneath the downstream end of the lower conveyor 1 and acting basically in that zone, caisson 8 being set up beneath the bending form 4 in ready position beneath the downstream end of the upper conveyor 3.

Each caisson 7 and 8 is equipped with its own calibration means of the volume pressure of gas that it blows, those calibration means being diagrammed as flaps 9 and 10, respectively, arranged at the base of each caisson 7 and 8, on the intake duct 11, 12 of gas under pressure.

The blown gasses are hot gasses either for maintaining the glass pane at a high temperature, or for heating to attain this high temperature.

The lower conveyor 1 can be as diagrammed in the figures a roller conveyor like 13. But it can also be any intake means of glass panes to be bent 2, thus for instance a belt or wheel, gas cushion conveyor, a support like a trolley which places the glass panes under the upward end of the upper conveyor 3 and above blowing means S. Therefore, the term lower conveyor encompasses a multitude of possible means.

On FIGS. 1, 2, 3, 4 and 5, the upper conveyor 2 is a gas cushion conveyor which includes a gas blowing caisson 14 which forms the gas cushion, supplied with gas under pressure from a duct 15, that caisson 14 being provided on its lower side designed to be facing the glass panes 2 with a pane 16 perforated with orifices as in 17 by which the gas escapes. This is a schematic description of a gas cushion conveyor, but such conveyors are well known. Obviously, other variations of a gas cushion conveyor are possible: with blowing nozzles or hubs instead of orifices 17 through the pane 16, with a plurality of caissons instead of the only one covering the entire surface of the conveyor, etc.

As a gas cushion conveyor, reference is made to that described in the publication of French Pat. No. 1,527,937.

This conveyor 3 displays its side facing the glass panes to be carried, directed downwards; it is advantageously oblique, or the zone which receives the glass panes is at a much lower level than the end position where said glass panes arrive after having been shifted along said conveyor, and it is fed with hot gasses so as to preserve the high temperature for glass panes which they possess on arriving inside the device, or to converge for raising the temperature, thus permitting their bending and later tempering as well.

Advantageously, additional means, for instance such as a guide 18, the position of which can be adjusted, is provided in order to facilitate the guidance preferably of glass panes 2 during their travel on gas cushion conveyor 3. In the event that the conveyor 3 is not oblique, or in the event that the tilt is not sufficient for the shift of glass panes 2 to take place without further assistance, means are provided which allow the glass panes to advance or aid in their advance. These can consist for instance of chain or mobile pin systems moving along the entire length of the conveyor 3.

Figure 6:
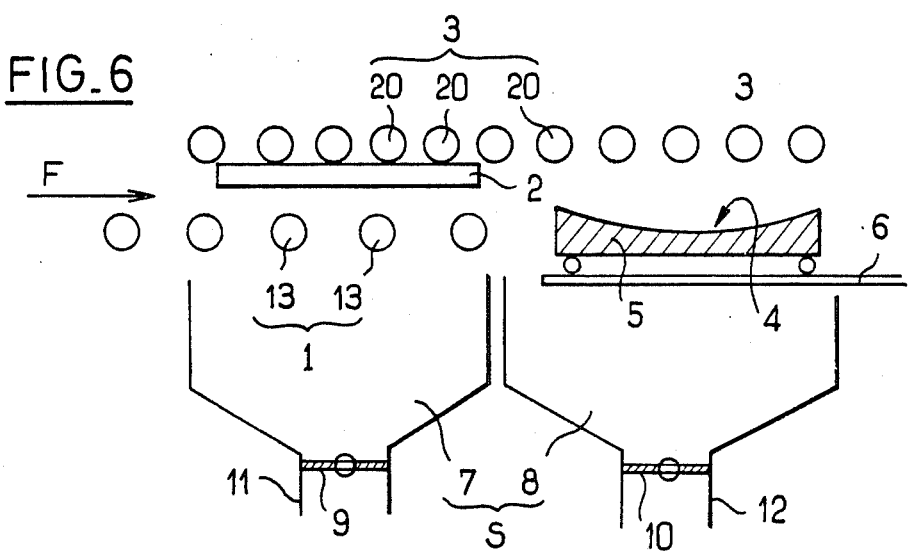
FIG. 6 is a second bending device variation.

FIG. 6 displays an alternative variation of the bending device according to the invention wherein the upper conveyor 3 is a roller conveyor such as 19. This roller conveyor 3 can be an oblique ascent in order to facilitate the evolution of the glass panes along its length, without help from external means, but it can also be horizontal, and even descending, without interfering with the operation of the process. The glass panes blown flat against the lower side of said conveyor, simply need to be pulled along the conveyor, with the rotation of the rollers 19, this rotation taking place for instance as a result of conventional drive systems such as a driving chain meshing on gears associated with each roller 19.

In other variations the upper conveyor 3 can be provided with both gas cushion and with rollers; blowing is anticipated between the rollers in order to minimize pressure of the panes against the rollers. In this embodiment, the rollers help in the advance of the glass panes.

The system operates according to the following process.

A glass pane 2 arrives inside the bending device on the lower conveyor 1 (phase illustrated in FIG. 1). As soon as this pane is in position, therefore above the blowing caisson 7, blowing begins, and raises the glass pane and flattens it against the upper air cushion conveyor 3 (phase illustrated in FIG. 2) or roller.

Ascending blowing continues to be exerted, so the glass pane remains in contact with the upper conveyor 3. Because the conveyor is oblique, the blowing drives the advance of the glass pane along said conveyor (phase illustrated in FIG. 3). In cases where the conveyor is not oblique, the driving means set forth causes the glass pane to advance, whether it is a mobile pin, a chain, etc., connected with the air cushion conveyor, or whether it involves motive rollers 19 from the roller conveyor 3.

Then, the glass pane passes to the influence of the gas blown from the caisson 8.

A bending form 4, such as a bending frame, is present beneath the downstream end of the conveyor 3, either static in that position, or brought back to a ready position during the previous phases by trolley 5 running on rails 6.

The blowing under the glass pane is reduced or ceases, which leads to a slow descent, up to a sudden fall, of the glass pane onto the bending form (phase of the process illustrated in FIG. 4).

On the bending form, the high temperature glass pane acquires the desired shape (phase of the process illustrated in FIG. 5) as a result of gravity and ultimately the transformation of kinetic energy acquired by the glass pane during its fall.

If the blowing from caisson 8 is not stopped completely, it is therefore possible to control the descent of the glass pane onto the bending form, and even after that to control the curve that said glass pane will adopt at the center of bending form comprised of a frame open at its center.

Finally, the glass pane is evacuated from the bending device. That occurs usually by removing from said device, the bending form unit and the glass pane that it supports, by rolling the trolley 5 on rails 6.

But it is also possible to leave the bending form in place and recover and the bent glass pane, alone, for instance with a suction transfer system, which is conventional in the area of glass pane handling.

Most of the time, after bending, the glass pane is subjected to tempering.

The bending form can be concave or convex. It can be located more or less at the same level as the glass pane intake conveyor 1, or on the contrary at a different level, lower or higher.

Other means can also be provided in addition, so as to complete or accelerate the bending, for instance, a press.

In such a device the glass panes for bending can succeed each other very rapidly. They can arrive in uninterrupted fashion one behind the other on the intake conveyor 1, then on the upper conveyor 3 and then they can descend to the various bending forms of a carousel. Thus, a plurality of trolleys where each carriers a bending form, can be placed one behind the other beneath the downstream end of the conveyor 3, right in time to receive a glass pane, and then they can exit from the device and bear their glass pane to the following work station, especially a tampering station.

Thus, the pace can be very high and energy consumption reduced as a result of the low volume required to be kept at a high temperature. Indeed, the entire device is enclosed inside a heated structure, especially by hot gasses from the different caissons, but this structure can have a low volume, both conveyors being close to one another. Furthermore, the blown gas, usually air, can be recycled.

With this process, equipment changes required by model changes in windows for manufacturing, such as they were exercised in the prior art, are unnecessary. At best, one might have to modify the position of a guide 18 for the glass panes which is associated to the upper conveyor 3.

The device wherein the upper conveyor 3 is provided with a gas cushion is especially suited for bending glass panes provided on their upper side with enameled patterns, that are still quite fragile during the bending phase. The lack of contact of this upper side of the glass panes with any mechanical means prevents decay of those enamel patterns on the one hand, and tarnishing of the equipment on the other.

In such a device there can be a succession of glass panes to be bent, fitted or not with enamel patterns or other, those patterns can vary from one glass pane to the other, and those glass panes with varied shapes and/or sizes, without it being necessary to modify, change or adapt anything. Therefore no temperature setting time, no preparation time is envisioned for each change of manufactured window model.

This process wherein glass panes are blown upwardly to their encounter with an upper conveyor, shifted along that conveyor, then brought down again, was described within the framework of a bending operation, but it can also apply to any transfer of objects such as glass panes, from one support to another, for instance from one conveyor to another conveyor, from one work station to another, etc.

In one alternative variation, maintenance of the glass panes supported against the upper conveyor 3 can be achieved by suction through said conveyor.

To this end, in the case of an upper conveyor 3 with gas cushion, the device described in the prior patent FR No. 1527 937 where blowing and suction orifices alternate can be employed.

In such a variation, the upper conveyor 3 is still oblique advantageously, but in that case it is preferably descending if the glass panes are to be transferred without the help of mechanical means like chains, pins.

Blowing through lower caissons 7 and 8 can be provided together with suction through the upper conveyor 3 in order to maintain the glass panes on contact with said conveyor.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for bending glass panes heated to their bending temperature, comprising:
   providing said glass panes in a substantially horizontally position,
   raising said panes by blowing a gas from underneath said panes such that they meet the downward facing surface of a stationary upper conveyor of a length to support, along its length, a plurality of panes at one time,
   maintaining said panes against said downward facing surface by pressure while moving said panes along the length of said surface,
   lowering said panes onto a bending means comprising at least one bending form situated at the downstream end of said conveyor.

2. A process according to claim 1, wherein the upper conveyor is oblique, the glass panes being shifted along said conveyor, from a first level at the upstream end of said conveyor to a different level, at the downstream end of the conveyor proximal to the bending form.

3. The process of claim 1, wherein said panes are raised solely by said blowing from below.

4. A process according to claim 1, wherein the glass panes are maintained in contact with the upper conveyor by way of an ascending gas flow.

5. A process according to claim 4, wherein the gas flow which is responsible for the rise of the glass panes and that which is active during their descent onto the bending form are two different flows provided by independent blowing caissons.

6. A process according to claim 1, which comprises receiving said panes on the upper conveyor with a gas cushion and/or rollers.

7. A process according to claim 1, wherein the blow gases are hot gases.

8. A process according to claim 1, wherein the bending form is a curved profile frame, open at its center.

9. A process according to claim 1, further comprising evacuating the bending form which has received a glass pane from the bending device, with its glass pane.

10. A process according to claim 1, further comprising providing a plurality of bending forms, one after the other in relay, to replace the form having received a pane of glass.

11. Apparatus for bending glass panes heated to their bending temperature, comprising:
    (1) lower support means for providing said heated glass is a substantially horizontal position,
    (2) an upper stationary conveyor of a length to support a plurality of panes along its length at any one time, located such that the upstream end of said upper conveyor is above the downstream end of said lower support means,
    (3) means for blowing gas from underneath said lower support means so as to lift said panes against the lower face of said upper conveyor and thereafter maintain said glass against said lower face,
    (4) means for advancing said glass panes along the length of the lower face of said upper conveyor,
    (5) bending means comprising at least one bending form located under the downstream end of said upper conveyor so as to receive the plurality of heated panel therefrom.

12. A device according to claim 11, wherein the means for advancing the glass panes along the upper conveyor comprise oblique placement of said conveyor associated with the blowing of ascending gas that maintains said glass panes in contact with said conveyor.

13. A device according to claim 11, wherein the means for advancing said glass panes comprises at least one of chains, mobile fingers and motive rollers.

14. A device according to claim 11, wherein the lower face of said upper conveyor is provided with a gas cushion.

15. A device according to claim 11, wherein the bending form is a curved profile frame that is open at its center.

16. A process according to claim 3, characterized in that the upper conveyor 3 is ascending from upstream to downstream ends.

* * * * *